US010270082B2

(12) United States Patent
Horiguchi et al.

(10) Patent No.: US 10,270,082 B2
(45) Date of Patent: Apr. 23, 2019

(54) POROUS CARBON MATERIAL AND METHOD FOR MANUFACTURING POROUS CARBON MATERIAL

(71) Applicant: TORAY INDUSTRIES, INC., Tokyo (JP)

(72) Inventors: Tomoyuki Horiguchi, Otsu (JP); Kentaro Tanaka, Otsu (JP); Kosaku Takeuchi, Otsu (JP); Takaaki Mihara, Otsu (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 15/322,944

(22) PCT Filed: Jun. 26, 2015

(86) PCT No.: PCT/JP2015/068553
§ 371 (c)(1),
(2) Date: Dec. 29, 2016

(87) PCT Pub. No.: WO2016/002668
PCT Pub. Date: Jan. 7, 2016

(65) Prior Publication Data
US 2017/0166451 A1    Jun. 15, 2017

(30) Foreign Application Priority Data

Jul. 3, 2014    (JP) ................................. 2014-137448

(51) Int. Cl.
*H01B 1/00*    (2006.01)
*H01M 4/38*    (2006.01)
(Continued)

(52) U.S. Cl.
CPC ............... *H01M 4/02* (2013.01); *B01J 20/20* (2013.01); *B01J 20/28* (2013.01); *B01J 20/30* (2013.01);
(Continued)

(58) Field of Classification Search
CPC .... H01B 1/00; H01B 1/04; H01B 1/24; C01B 32/00; C01B 32/15; C01B 32/30; H01M 4/38
See application file for complete search history.

(56) References Cited

U.S. PATENT DOCUMENTS 7,091,156 B2 *    8/2006  Hirahara ................ H01G 11/24
                                                  361/502
7,214,646 B1    5/2007  Fujino
(Continued)

FOREIGN PATENT DOCUMENTS

CN    1878898 B    6/2012
EP    0594301 A1    4/1994
(Continued)

OTHER PUBLICATIONS

Tang et al "Fabrication of a high-strength hydrogel with an interpenetrating network structure", Colloids and Surfaces A: Physiochem. Eng. Aspects 346 (2009) 91-98. (Year: 2009) (Year: 2009).*
(Continued)

*Primary Examiner* — Mark Kopec
(74) *Attorney, Agent, or Firm* — RatnerPrestia

(57) ABSTRACT

The present invention relates to a porous carbon material having a co-continuous structure forming portion in which carbon skeletons and voids form continuous structures, respectively and which has a structural period of 0.002 μm to 3 μm, having pores which have an average diameter of 0.01 to 10 nm on a surface thereof, and having a BET specific surface area of 100 m²/g or more.

12 Claims, 2 Drawing Sheets

(51) Int. Cl.

| | | |
|---|---|---|
| *C01B 32/00* | (2017.01) | |
| *H01G 11/00* | (2013.01) | |
| *H01M 4/02* | (2006.01) | |
| *H01B 1/04* | (2006.01) | |
| *B01J 20/20* | (2006.01) | |
| *B01J 20/28* | (2006.01) | |
| *B01J 20/30* | (2006.01) | |
| *C04B 38/06* | (2006.01) | |
| *H01G 11/24* | (2013.01) | |
| *H01G 11/34* | (2013.01) | |
| *H01M 4/587* | (2010.01) | |
| *H01M 4/62* | (2006.01) | |
| *B01J 37/08* | (2006.01) | |
| *C01B 32/05* | (2017.01) | |
| *C01B 32/366* | (2017.01) | |

(52) U.S. Cl.
CPC ............ *B01J 37/084* (2013.01); *C01B 32/00* (2017.08); *C01B 32/05* (2017.08); *C01B 32/366* (2017.08); *C04B 38/06* (2013.01); *H01B 1/04* (2013.01); *H01G 11/00* (2013.01); *H01G 11/24* (2013.01); *H01G 11/34* (2013.01); *H01M 4/38* (2013.01); *H01M 4/587* (2013.01); *H01M 4/62* (2013.01); *H01M 2004/021* (2013.01); *Y02E 60/13* (2013.01)

(56) References Cited

U.S. PATENT DOCUMENTS

| | | | |
|---|---|---|---|
| 9,156,694 | B2 | 10/2015 | Morishita |
| 2004/0047111 | A1 | 3/2004 | Maeda et al. |
| 2005/0260118 | A1* | 11/2005 | Lu .................. B01D 53/228 423/445 R |
| 2007/0122687 | A1 | 5/2007 | Sakurai et al. |
| 2007/0183958 | A1 | 8/2007 | Fujino |
| 2009/0269667 | A1* | 10/2009 | Antonietti .......... H01G 11/34 429/231.4 |
| 2011/0318254 | A1 | 12/2011 | Morishita |
| 2013/0084501 | A1* | 4/2013 | Wakayama ......... H01M 4/1397 429/231.8 |
| 2013/0330504 | A1* | 12/2013 | Morishita .............. B32B 3/12 428/116 |
| 2016/0046491 | A1 | 2/2016 | Mihara |
| 2017/0331101 | A1* | 11/2017 | Tachibana ............ H01M 4/505 |

FOREIGN PATENT DOCUMENTS

| | | |
|---|---|---|
| EP | 1686208 A1 | 8/2006 |
| JP | 02160923 | 6/1990 |
| JP | 02160924 | 6/1990 |
| JP | 2001052972 | 2/2001 |
| JP | 2004026954 | 1/2004 |
| JP | 2007039289 | 2/2007 |
| JP | 2010208887 | 9/2010 |
| TW | 200517538 A | 6/2005 |
| WO | 2012131628 | 10/2012 |
| WO | WO 2012131628 A1 * | 10/2012 |
| WO | 2014148303 | 9/2014 |

OTHER PUBLICATIONS

Han et al "Porous graphite matrix for chemical heat pumps", Carbon vol. 36, No. 12, pp. 1801-1810. (Year: 1998) (Year: 1998).*
Hwang et al "Capacitance control of carbon aerogel electrodes", Journal of Non-Crystalline Solids 347 (2004) 238-245. (Year: 2004) (Year: 2004).*
Borchardt et al "Toward a molecular design of porous carbon materials", Materials Today, vol. 20, No. 10, Dec. 2017, pp. 593-610. (Year: 2017).*
Zakhidov et al "Carbon structures with three-dimensional periodicity at optical wavelengths", Science vol. 282, Oct. 1998, pp. 897-901. (Year: 1998).*
Extended European Search Report for European Application No. 15 815 088.8, dated Feb. 13, 2018, 9 pages.
International Search Report and Written Opinion for International Application No. PCT/JP2015/068553, dated Oct. 6, 2015, 7 pages.
Barrett et al., "The Determinatin of Pore Volume and Area Distribuitons in Porous Substances. I. Computations from Nitrogen Isotherms", J. Amer. Chem. Soc., 73, 373, 1951, pp. 373-380.
George Hasegawa et al., "Hierarchically porous carbon monoliths with high surface area from bridged polysi l sesquioxanes without thermal activation process", Chemical Communications, vol. 46, No. 42, Jan. 1, 2010.

* cited by examiner

POROUS CARBON MATERIAL AND METHOD FOR MANUFACTURING POROUS CARBON MATERIAL

CROSS REFERENCE TO RELATED APPLICATIONS

This is the U.S. National Phase application of PCT International Application No. PCT/JP2015/068553, filed Jun. 26, 2015, and claims priority to Japanese Patent Application No. 2014-137448, filed Jul. 3, 2014, the disclosures of each of these applications being incorporated herein by reference in their entireties for all purposes.

FIELD OF THE INVENTION

The present invention relates to a porous carbon material which can be developed into various applications and a process for producing the porous carbon material.

BACKGROUND OF THE INVENTION

Porous carbon materials are materials which can be used in wide areas such as adsorption materials, separation membranes, electrode materials and catalyst carriers, and have been variously studied for activated carbon, carbon nanotube, mesoporous silica, zeolite, template carbon produced from a template of fine particles or the like, and the like.

Among them, the activated carbon has been widely used with a focus on industrial materials such as the adsorption materials and the catalyst carriers, utilizing its large specific surface. In general, the activated carbon is obtained by activating a carbon material obtained by carbonization of cellulose, a resin or the like to form pores. However, since the pores are formed unidirectionally from a surface of the carbon material to an inner part thereof during the activation process, communicated pores in which the pores are continuously communicated with one another are not formed. Accordingly, even when a high specific surface material is obtained by allowing the activation to proceed, fluidity in pores of a material to be adsorbed or the like is inferior, which has caused such a problem that it takes much time before an adsorption substance or the like arrives at the surface. Also, when activated carbon particles are aggregated, pores inside the aggregation are not utilized because the pores are not communicated with one another, which also causes such a problem that the original surface area cannot be fully utilized. Accordingly, continuous pores have been desired.

For example, Patent Document 1 describes a technique for obtaining activated carbon fiber by activating porous carbon fiber to form pores. However, when simply activated, the continuous pores cannot be formed.

Also, Patent Document 2 describes a technique for obtaining porous carbon fiber by mixing a carbonizable material with an eliminable material. However, the carbonizable material and the eliminable material are a combination of incompatible systems, and the mere addition of a compatibilizing agent was unable to form continuous pores.

On the other hand, Patent Document 3 shows an example of forming continuous pores by mixing a thermosetting resin with a thermoplastic resin, curing the thermosetting resin, subsequently removing the thermoplastic resin, and then performing carbonization. However, since the surface area is small, applications which can be utilized have been limited.

Also, Patent Document 4 discloses porous carbon having mesopores and micropores, in which carbon walls constituting contours of the mesopores have a three-dimensional network structure. However, although the carbon walls continue, voids formed by template particles only partially continue, and communicated pores have not been formed.

PATENT DOCUMENT

Patent Document 1: JP-A-2-160924
Patent Document 2: JP-A-2-160923
Patent Document 3: JP-A-2004-26954
Patent Document 4: JP-A-2010-208887

SUMMARY OF THE INVENTION

As described above, no conventional porous carbon materials have compatibly achieved a structure where communicated pores through which an adsorption substance or the like is easily accessible to a surface are present, in addition to a large surface area on which the adsorption substance or the like can act and continuity of carbon skeletons. The present invention provides a porous carbon material excellent in electrical conductivity, thermal conductivity, adsorptivity and the like by having a co-continuous porous structure due to the carbon skeletons and voids and imparting the large surface area.

The present invention relates to a porous carbon material having a co-continuous structure portion in which carbon skeletons and voids form continuous structures; respectively and which has a structural period of 0.002 μm to 3 μm, having pores which have an average diameter of 0.01 to 10 nm on a surface thereof, and having a BET specific surface area of 100 $m^2$/g or more.

Additionally, a production process of an aspect of the present invention for producing the porous carbon material is a process for producing a porous carbon material, the process including:

step 1: a step of bringing 10 to 90% by weight of a carbonizable resin and 90 to 10% by weight of an eliminable resin into a compatibly mixed state to obtain a resin mixture;

step 2: a step of causing the resin mixture to undergo phase separation by a method not accompanied with a chemical reaction, and fixing the separated phases;

step 3: a step of performing carbonization by pyrolysis; and step 4: a step of activation, in this order.

A porous carbon material of the present invention has a large surface area in a co-continuous structure portion, thereby increasing the area on which an adsorption substance, an active substance or the like can act, and therefore, it becomes possible to exhibit high performance in electrode materials such as lithium ion batteries and capacitors, adsorption materials used for purification, medical treatment or the like, heat conductors and the like. Also, performance of transmitting a function generated on a carbon surface or the like, for example, electrical conductivity or thermal conductivity, can be enhanced because carbon skeletons are continuous. In addition, resistance to deformation such as tensile deformation and compressive deformation is also obtained to some extent by an effect of mutually supporting a structure with the carbon skeletons. Furthermore, adsorption of the adsorption substance, the active substance or the like to the carbon surface and the acting effect thereof can be improved, because portions other than the carbon skeletons are continuous as voids.

DETAILED DESCRIPTION OF EMBODIMENTS OF THE INVENTION

<Porous Carbon Material>

[Co-Continuous Structure Portion]

Figure 1:
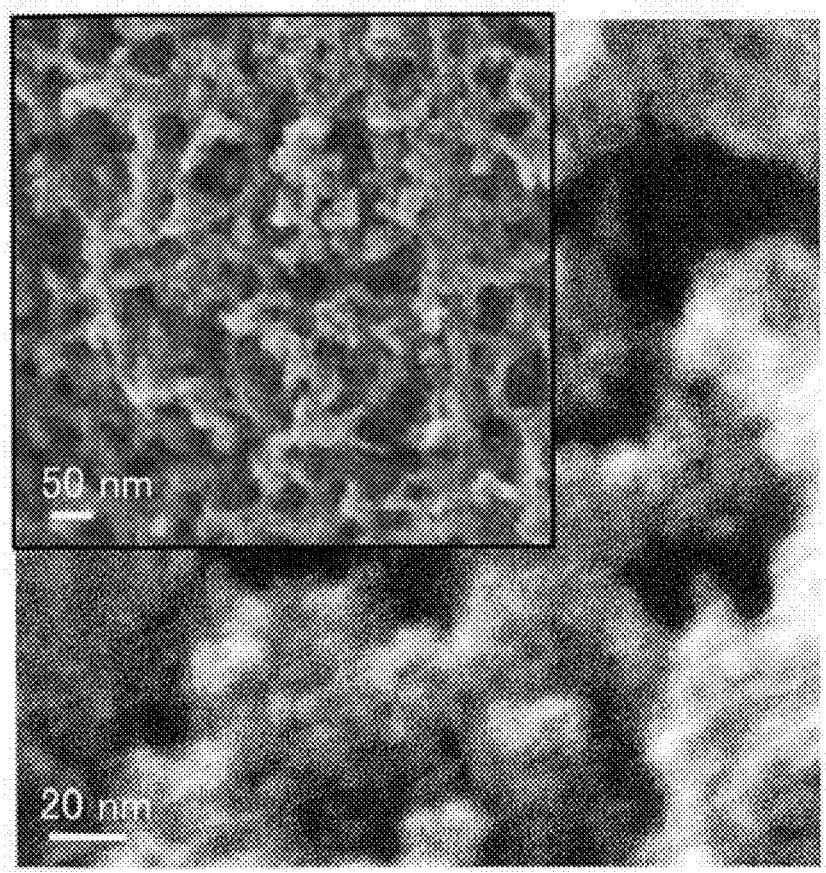
FIG. 1 is a scanning electron photomicrograph of a porous carbon material of Example 1.
Figure 2:
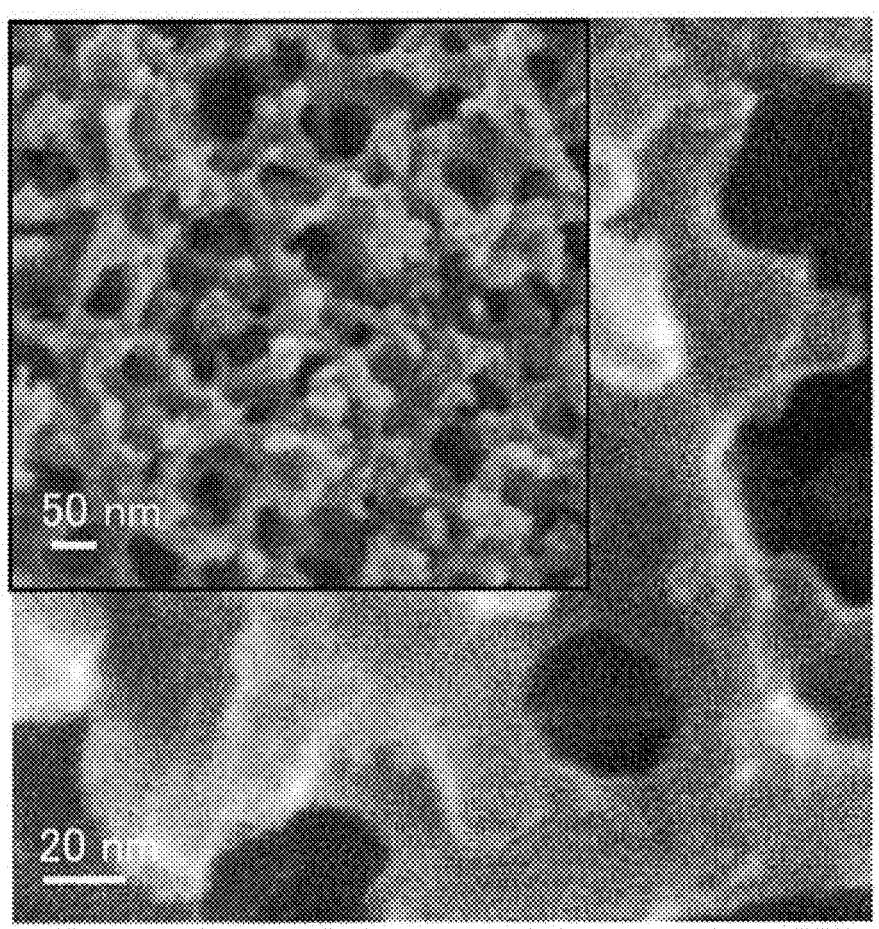
FIG. 2 is a scanning electron photomicrograph of a porous carbon material of Comparative Example 3.

A porous carbon material (hereinafter sometimes simply referred to as a "material") of an aspect of the present invention has a co-continuous structure portion in which carbon skeletons and voids form continuous structures, respectively. That is, for example, when a specimen of the porous carbon material which has been sufficiently cooled in liquid nitrogen is cut with tweezers or the like and the cut surface is examined with a scanning electron microscope (SEM) or the like, the carbon skeletons and the voids formed as portions other than the skeletons form a so-called co-continuous structure. Specifically, it has a portion in which the carbon skeletons and the voids are observed as continuous structures, respectively, in a depth direction, as exemplified in a scanning electron photomicrograph of a porous carbon material of Example 1 in FIG. 1.

In the porous carbon material of the present invention, it also becomes possible to exhibit fractionation characteristics such as separation, adsorption and desorption of a substance by filling and/or flowing a fluid in the voids of the co-continuous structure portion or to impart a function as a battery material by using an electrolytic solution. Also, electrical conductivity or thermal conductivity can be enhanced because carbon skeletons are continuous. Accordingly, a material having a low resistance and a small loss can be provided as the battery material. Further, it also becomes possible to maintain high temperature uniformity by rapidly transferring heat generated to the outside of a system. In addition, the material having high resistance also to deformation such as tensile deformation and compressive deformation can be obtained by an effect of mutually supporting a structure with the carbon portions.

These co-continuous structures include but are not particularly limited to lattice-like and monolithic structures. However, it is preferred to be monolithic, in terms of being capable of exhibiting the effects described above. The monolithic structure as referred to in the present invention means a form in which the carbon skeletons have a three-dimensional network structure in the co-continuous structure, and is distinguished from an irregular structure such as a structure in which individual particles are aggregated/connected, or a structure formed by voids and skeletons in the peripheries thereof, the voids being generated by conversely removing aggregated/connected template particles.

Also, the structural period of the co-continuous structure portion in the porous carbon material of an embodiment of the present invention is from 0.002 μm to 3 μm. In the present invention, the structural period is calculated from a scattering angle θ at a position where the scattering intensity has a peak value when an X-ray is made incident to a specimen of the porous carbon material of the present invention, by the following formula:

$$L = \frac{\lambda}{2\sin\theta}$$ [Math. 1]

Structural period: L,
λ: wavelength of incident X-ray

When the structural period of the co-continuous structure portion is 0.002 μm or more, not only a fluid can be filled and/or flowed in the void portions, but also it becomes possible to improve the electrical conductivity and the thermal conductivity through the carbon skeletons. The structural period is preferably 0.01 μm or more, and more preferably 0.1 μm or more. Also, when the structural period is 3 μm or less, a high surface area and physical properties can be obtained. The structural period is preferably 2 μm or less, and more preferably 1 μm or less. Further, flow resistance can be reduced by having a uniform continuous structure, and utilization as the ideal fractionation material is possible. In the case of analyzing the structural period by X-rays, a portion having no co-continuous structure does not exert an influence on the analysis, because the structural period thereof is outside the range described above. Therefore, the structural period calculated by the formula described above shall be the structural period of the co-continuous structure forming portion.

The smaller the structural period is, the finer the structure is, and the larger the surface area per unit volume or unit weight is. For example, when a catalyst is carried, the contact efficiency of the catalyst with a fluid is increased. Also, the larger the structural period is, the more the pressure loss is decreased, and it becomes possible to fill and/or flow a large amount of a fluid. From these, the structural period of the co-continuous structure portion can be appropriately adjusted depending on the application to be used.

Since the porous carbon material of an embodiment of the present invention has a small structural size distribution in a portion having a continuous void structure, it is suitable as an adsorption material. In particular, it is suitable for a HPLC column material having high fractionation characteristics. Further, it is also applicable to a base material for carrying a catalyst on a surface of the skeleton portion having the continuous structure.

Also, the co-continuous structure portion preferably has an average porosity of 10% to 80%. The average porosity is calculated by the following formula, when a region of interest necessary for calculation is set to 512 pixels square from an image obtained by observing a cross-section precisely formed from an embedded specimen by a cross-section polisher method (CP method), at a magnification ratio adjusted so as to give 1±0.1 (nm/pixel) and a resolution of 700,000 pixels or more, the area of the region of interest is taken as A, and the area of a pore portion is taken as B.

Average porosity (%)=$B/A$×100

The higher the average porosity is, the more the filling efficiency is increased in the case of being composited with another material. In addition, the pressure loss is small as flow passages of a gas or a liquid, which makes it possible to increase the flow rate. On the other hand, the lower the average porosity is, the more the resistance to force applied in a cross-sectional direction, such as compression or bending, becomes strong. It is therefore advantageous in handleability or in use under pressurized conditions. Taking these into consideration, the average porosity of the co-continuous structure portion is preferably within a range of 15 to 75%, and more preferably within a range of 18 to 70%.

[Pores]

Further, the porous carbon material of an embodiment of the present invention has pores having an average diameter of 0.01 to 10 nm on a surface thereof. The surface indicates all contact surfaces with the outside, including surfaces of the carbon skeletons in the co-continuous structure portion of the carbon material. The pores can be formed on the surface of the carbon skeleton in the co-continuous structure portion and/or on a portion having substantially no co-continuous structure, which is described later. However, it is preferred that the pores are formed at least on the surface of the carbon skeleton in the portion having the co-continuous structure.

The average diameter of such pores is preferably 0.1 nm or more, and more preferably 0.5 nm or more. Also, it is preferably 5 nm or less, and more preferably 2 nm or less. When the pores have an average diameter of 0.01 nm or more, the carbon material can function to an adsorption substance, an active substance or the like. Also, when it has an average diameter of 10 nm or less, functions such as adsorption can be efficiently exhibited. From the standpoint of efficient adsorption and the like, it is preferred that the pore diameter is appropriately adjusted to about 1.1 to 2.0 times the diameter of the target adsorption substance or the like.

Further, the pore volume of the porous carbon material of the present invention is preferably 0.1 $cm^3/g$ or more. The pore volume is more preferably 1.0 $cm^3/g$ or more, and still more preferably 1.5 $cm^3/g$ or more. Adsorption performance and the like of the adsorption substance or the active substance are more improved by a pore volume of 0.1 $cm^3/g$ or more. The upper limit thereof is not particularly limited. However, when it exceeds 10 $cm^3/g$, the strength of the porous carbon material is unfavorably decreased to tend to deteriorate the handleability.

In the present invention, the average diameter of the pores means a measured value measured by either of a BJH method and an MP method. That is, when either the measured value measured by the BJH method or the measured value measured by the MP method is within a range of 0.01 to 10 nm, it is judged as having the pores with an average diameter of 0.01 to 10 nm on the surface. The same applies to the preferred range of the pore diameter. The BJH method and the MP method are methods widely used as a pore diameter distribution analysis method, and the pore diameter distribution can be determined based on a desorption isothermal curve determined by adsorption and desorption of nitrogen by the porous carbon material. The BJH method is a method of analyzing the distribution of the pore volume to the diameter of the pores assumed as cylindrical, according to a standard model of Barrett-Joyner-Halenda, and can be mainly applied to the pores having a diameter of 2 to 200 nm (for more details, see J. Amer. Chem. Soc., 73, 373, 1951, etc.). Also, the MP method is a method of obtaining pore diameter distribution by determining the pore volume based on the external surface area and the adsorption layer thickness (corresponding to the pore radius because the pore shape is assumed as cylindrical) in each section determined from a change in the inclination of a tangent line at each point of the desorption isothermal curve, and plotting the pore volume with respect to the adsorption layer thickness (for more details, see Journal of Colloid and Interface Science, 26, 45, 1968, etc.), and can be mainly applied to the pores having a diameter of 0.4 to 2 nm. In the present invention, a value determined to 1 decimal place by rounding off to 2 decimal places is used in each case.

In the porous carbon material of the present invention, there is a possibility that the voids of the co-continuous structure portion have an influence on the pore diameter distribution or the pore volume measured by the BJH method or the MP method. That is, there is a possibility that these measured values are obtained as values reflecting not only purely the pores but also the presence of the voids. However, even in that case, the measured values determined by these methods shall be judged as the average diameter of the pores and the pore volume in the present invention. Also, when the pore volume measured by the BJH method or the MP method is less than 0.05 $cm^3/g$, it is judged that the pores are not formed on the material surface.

Also, the porous carbon material of an embodiment of the present invention has a BET specific surface area of 100 $m^2/g$ or more. The BET specific surface area is preferably 1,000 $m^2/g$ or more, more preferably 1,500 $m^2/g$ or more, and still more preferably 2,000 $m^2/g$ or more. When it is 100 $m^2/g$ or more, the area to the adsorption substance or the active substance is increased to improve the performance. The upper limit thereof is not particularly limited. However, when it exceeds 4,500 $cm^2/g$, the strength of the porous carbon material is decreased to tend to deteriorate the handleability. The BET specific surface area in the present invention can be determined by measuring the desorption isothermal curve by adsorption and desorption of nitrogen by the porous carbon material in accordance with JISR 1626 (1996) and calculating the measured data, based on a BET equation.

[Portion Having Substantially No Co-Continuous Structure]

In the porous carbon material of the present invention, it is also a preferred embodiment to contain the portion having substantially no co-continuous structure (hereinafter sometimes simply referred to as the "portion having no co-continuous structure). The term "portion having substantially no co-continuous structure" means that when a cross-section allowed to be formed by a cross-section polisher method (CP method) is observed at a magnification of 1±0.1 (nm/pixel), a portion in which voids are not clearly observed because of being below a resolution is present with an area beyond a square region, each side of which corresponds to 3 times a structural period L calculated from X-ray analysis described later.

Since the portion having substantially no co-continuous structure is densely filled with carbon, electron conductivity is high. Therefore, the electrical conductivity and the thermal conductivity can be maintained to a predetermined level or above. For example, when used as the battery material, it is possible to rapidly discharge reaction heat to the outside of a system, or to decrease resistance in exchanging electrons. Also, it is possible to enhance particularly the resistance to compression failure by the presence of the portion having no co-continuous structure.

The ratio of the portion having no co-continuous structure may be appropriately adjusted depending on each application. For example, when the portion having no co-continuous structure is used as a wall surface of the fractionation material or used as the battery material, the ratio of the portion having no co-continuous structure is preferably 5% by volume or more, because it is possible to prevent a liquid from leaking from the co-continuous structure portion or to maintain the electrical conductivity and the thermal conductivity to a high level.

Also, it is also possible to use as a functional material having the co-continuous structure portion as flow channels and the portion having no co-continuous structure as a functional portion. Specifically, a gas or a liquid can be flowed through the voids in the co-continuous structure portion as the flow channels, and separation can be performed in the portion having no co-continuous structure.

In the case of a form in which the co-continuous structure portion is covered with the portion having no co-continuous structure, it becomes possible to more efficiently fill and/or flow the fluid in the void portions constituting the co-continuous structure. Hereinafter, in the porous carbon material of this form, the co-continuous structure portion is called a core layer, and the portion having substantially no co-continuous structure, which is formed so as to cover the core layer, is called a skin layer. For example, when used for the separation membrane application, efficient filtration and separation become possible using the skin layer as a separation functional layer and the core layer as the flow channel of the liquid, because of having an asymmetric structure formed with the skin layer and the core layer. Also, by having the core layer, for example, not only it is easy to impregnate another material from a cross-section of the material, for example, having a form of a fiber or a film, into the inside of the co-continuous structure, but also it becomes possible to be used as a path for substance permeation. It is therefore possible to be utilized as a flow channel of a separation column or a gas flow channel of a gas separation membrane.

The continuous structure of the core layer is preferably formed so that the structural period in a central part is from 0.002 μm to 3 μm. Also, similarly, the average porosity in the central part is preferably from 10 to 80%. The term "central part" as referred to herein indicates the gravity center when the mass distribution in the cross-section of the material is assumed to be uniform, in the porous carbon material. In the case of a powder particle, for example, the gravity center thereof is the central part. In the case where the material is in the form of a fiber which has a round cross-section, the "central part" indicates a point where the distances from the fiber surface are the same in a cross-section of the fiber perpendicular to the fiber axis. However, in the case of a film shape in which it is difficult to clearly define the gravity center thereof, the "central part" thereof is defined as follows. Namely, a vertical line is drawn from the film surface in the cross-section perpendicular to TD or MD direction. Then, an aggregate of points which are placed at one-half of the film thickness on the vertical line is defined as the "central part". Similarly, in the case of a hollow fiber in which the gravity center thereof is not within the material, the "central part" thereof is defined as follows. Namely, a vertical line is drawn from the tangent line of the outer surface of the hollow fiber. Then an aggregate of points which are placed at one-half of the material thickness on the vertical line is defined as the "central part". The structural period can be measured by the X-ray analysis described above.

The skin layer is the portion having substantially no co-continuous structure, which is formed in the periphery of the core layer so as to cover the core layer. The thickness of the skin layer is not particularly limited, and can be approximately selected depending on the application of the material. However, when it is too thick, there is a tendency that the porosity is decreased as the porous carbon material. It is therefore preferably 100 μm or less, more preferably 50 μm or less, and most preferably 20 μm or less. Although the lower limit thereof is not particularly limited herein, it is preferably 1 nm or more, from the standpoint of keeping the form of the material and exhibiting the function different from that of the core layer.

[Form of Porous Carbon Material]

The form of the porous carbon material of the present invention is not particularly limited, and examples thereof include massive, rod-like, flat plate-like, disk-like and spherical forms. Above all, however, fibrous, film-like and powdery forms are preferred.

The fibrous form indicates a form having an average length of 100 times or more the average diameter thereof. It may be a filament or a long fiber, or a staple fiber, a short fiber or a chopped fiber. Also, the shape of the cross-section is not limited in any way, and may be any shape such as a round cross-section, a multilobal cross-section such as a triangular cross-section, a flat cross-section and a hollow cross-section.

In particular, in the case of a fiber in which the core layer having the co-continuous structure is used as the core and the skin layer having substantially no co-continuous structure is formed therearound, it is possible to fill and/or flow a fluid in the core layer, and particularly in the case of flowing an electrolytic solution, an efficient electrochemical reaction can be performed in the co-continuous structure. Also, when the fluid is filled and/or flowed at high pressure, a high compression resistance is shown because the structure is mutually supported with the carbon skeletons of the co-continuous structure portion, and it becomes possible to efficiently fill and/or flow the fluid.

The average diameter of the fiber is not particularly limited, and can be arbitrarily determined depending on the application thereof. However, from the standpoint of the handleability and maintaining the porous material, it is preferably 10 nm or more. Also, from the standpoint of securing bending rigidity to improve the handleability, it is preferably 5,000 μm or less.

The film-like form can be suitably used, for example, for the applications such as an electrode of a battery material and an electromagnetic wave shielding material, because the co-continuous structure portion is composited with another material, and it becomes possible to be used as a sheet as it is. In particular, the case of a film including the core layer having the co-continuous structure and the skin layer(s) having substantially no co-continuous structure on one side or both sides of the core layer is a preferred embodiment, because the skin layer can maintain the electrical conductivity and the thermal conductivity to a high level and functions as an interface suitable for adhesion with another material. Further, an embodiment in which the skin layer is formed only on the one side of the film is preferred, because it becomes easy to composite the core layer as the co-continuous structure portion with another material.

The thickness of the film is not particularly limited, and can be arbitrarily determined depending on the application thereof. However, when the handleability is taken into consideration, it is preferably 10 nm or more, and from the standpoint of preventing breakage due to bending, it is preferably 5,000 μm or less.

A granular form is suitably used, for example, for the battery material application such as an electrode, and the like. The portion having no co-continuous structure occupies a part of one particle, whereby not only it becomes possible to enhance the electrical conductivity and the thermal conductivity in the particle, but also an effect such as increasing the compression strength of the particle itself to decrease performance deterioration under high pressure can be expected. This is therefore preferred.

Also, the diameter of the particle is not particularly limited, and can be appropriately selected depending on the application thereof. However, it is preferably within a range of 10 nm to 10 mm, because of easy handling. In particular, when it is 10 μm or less, for example, a very smooth solid component for forming paste is obtained, so that it is possible to prevent defects such as paste peeling off and cracking in a process such as coating. On the other hand, it is preferred that the diameter thereof is 0.1 μM or more, because when used as a composite material with a resin, a strength improving effect as a filler is sufficiently exhibited.

<Process for Producing Porous Carbon Material>

The porous carbon material of the present invention can be produced by a production process including, as one example, a step of bringing 10 to 90% by weight of a carbonizable resin and 90 to 10% by weight of an eliminable resin into a compatibly mixed state to obtain a resin mixture (step 1), a step of causing the resin mixture in the compatibly mixed state to undergo phase separation, and fixing the separated phases (step 2), a step of performing carbonization by pyrolysis (step 3) and a step of activating the carbonized material (step 4).

[Step 1]

The step 1 is a step of bringing 10 to 90% by weight of a carbonizable resin and 90 to 10% by weight of an eliminable resin into a compatibly mixed state to obtain a resin mixture.

The carbonizable resin as referred to herein is a resin which carbonizes upon pyrolysis and remains as a carbon material, and preferably has a carbonization yield of 40% or more. For example, both of a thermoplastic resin and a thermosetting resin can be used. Examples of the thermoplastic resins include poly(phenylene oxide), poly(vinyl alcohol), polyacrylonitrile, phenol resins and wholly aromatic polyesters. Examples of the thermosetting resins include unsaturated polyester resins, alkyd resins, melamine resins, urea resins, polyimide resins, diallyl phthalate resins, lignin resins, and urethane resins. In terms of cost and productivity, polyacrylonitrile and phenol resins are preferred, and polyacrylonitrile is more preferred. In particular, in the present invention, polyacrylonitrile is a preferred embodiment, because a high specific surface area can be obtained. These may be used individually or in a mixed state thereof. The carbonization yield as referred to herein means a value obtained by measuring changes in weight by a thermogravimetric (TG) method when the temperature is raised at 10° C./min under a nitrogen atmosphere, and dividing the difference between the weight at room temperature and the weight at 800° C. by the weight at room temperature.

Further, the eliminable resin is a resin which can be removed after the step 2 described later, and preferably, a resin which can be removed in at least any of stages simultaneous with infusibilizing treatment, after infusibilizing treatment and simultaneous with pyrolysis. The removal ratio is preferably 80% by weight or more, and more preferably 90% by weight or more, when the porous carbon material is finally obtained. A method for removing the eliminable resin is not particularly limited, and there is suitably used a method of chemically removing the eliminable resin, for example, by conducting depolymerization using a chemical, a method of removing the eliminable resin with a solvent capable of dissolving it, a method of removing the eliminable resin by lowering the molecular weight thereof by thermal decomposition by heating, or the like. These techniques may be used individually or in combination thereof. In the case of performing in combination, these may be simultaneously performed or separately performed.

As the method of chemically removing the eliminable resin, a method of performing hydrolysis using an acid or an alkali is preferred from the standpoint of profitability and the handleability. Resins which are susceptible to hydrolysis with an acid or an alkali include polyesters, polycarbonates, polyamides and the like.

Suitable examples of the methods of removing the eliminable resin with a solvent capable of dissolving it include a method of dissolving and removing the eliminable resin by continuously supplying the solvent to the carbonizable resin and the eliminable resin mixed, and a method in which the solvent and the resins are mixed batchwise to dissolve and remove the eliminable resin.

Specific examples of the eliminable resins suitable for the method of removing them using the solvent include polyolefins such as polyethylene, polypropylene and polystyrene, acrylic resins, methacrylic resins, polyvinylpyrrolidone, aliphatic polyesters, and polycarbonates. Among them, amorphous resins are more preferred from the standpoint of solubility in the solvent, and examples thereof include polystyrene, methacrylic resins, polycarbonates and polyvinylpyrrolidone.

Examples of the methods of removing the eliminable resin by lowering the molecular weight thereof by thermal decomposition include a method of heating batchwise the carbonizable resin and the eliminable resin mixed, thereby performing thermal decomposition, and a method of heating the carbonizable resin and the eliminable resin continuously mixed, while continuously supplying them into a heating source, thereby performing thermal decomposition.

Among these, the eliminable resin is preferably a resin which is eliminated by thermal decomposition when the carbonizable resin is carbonized by pyrolysis in the step 3 described later, and preferably a resin which does not undergo a large chemical change when the carbonizable resin is subjected to the infusibilizing treatment described later, and provides a carbonization yield of less than 10% after pyrolysis. Specific examples of such eliminable resins include polyolefins such as polyethylene, polypropylene and polystyrene, acrylic resins, methacrylic resins, polyacetal, polyvinylpyrrolidone, aliphatic polyesters, aromatic polyesters, aliphatic polyamides, and polycarbonates. These may be used individually or in a mixed state thereof.

In the step 1, the carbonizable resin and the eliminable resin are brought into the compatibly mixed state to obtain a resin mixture (polymer alloy). The term "brought into the compatibly mixed state" as referred to herein means that a state in which a phase separation structure between the carbonizable resin and the eliminable resin is not observed by an optical microscope is produced by suitably selecting conditions as to temperature and/or solvent.

The carbonizable resin and the eliminable resin may be brought into the compatibly mixed state by mixing only the resins with each other or by further adding a solvent thereto.

Examples of a system in which a plurality of resins have been brought into a compatibly mixed state include: a system which shows a phase diagram of the upper-limit critical solution temperature (UCST) type in which the resins are in a phase-separated state at low temperatures but form a single phase at high temperatures; and a system which conversely shows a phase diagram of the lower-limit critical solution temperature (LCST) type in which the resins are in a phase-separated state at high temperatures but form a single phase at low temperatures. Furthermore, especially in the case of a system in which at least one of the carbonizable resin and the eliminable resin has been dissolved in a solvent, preferred examples include one in which the phase separation, which will be described later, is induced by the infiltration of a non-solvent.

The solvent to be added is not particularly limited. Preferred is such a solvent that the absolute value of the difference between the solubility parameter (SP value) thereof and the average of the SP values of the carbonizable resin and eliminable resin is 5.0 or less, the absolute value being an index to dissolving properties. It is known that the smaller the absolute value of the difference from the average of the SP values, the higher the dissolving properties. It is therefore preferable that the difference is zero. Meanwhile, the larger the absolute value of the difference from the average of the SP values, the lower the dissolving properties and the more the compatibly mixed state of the carbonizable resin and eliminable resin is difficult to attain. In view of this, the absolute value of the difference from the average of the SP values is preferably 3.0 or less, most preferably 2.0 or less.

Specific examples of carbonizable resin/eliminable resin combinations to be brought into a compatibly mixed state, in the case where the system contains no solvent, include poly(phenylene oxide)/polystyrene, poly(phenylene oxide)/styrene-acrylonitrile copolymer, wholly aromatic polyester/poly(ethylene terephthalate), wholly aromatic polyester/poly(ethylene naphthalate), and wholly aromatic polyester/polycarbonate. Specific examples of the combinations, in the case where the system contains a solvent, include polyacrylonitrile/poly(vinyl alcohol), polyacrylonitrile/polyvinylphenol, polyacrylonitrile/polyvinylpyrrolidone, polyacrylonitrile/poly(lactic acid), poly(vinyl alcohol)/vinyl acetate-vinyl alcohol copolymer, poly(vinyl alcohol)/poly(ethylene glycol), poly(vinyl alcohol)/poly(propylene glycol), and poly(vinyl alcohol)/starch.

Methods for mixing the carbonizable resin with the eliminable resin are not limited, and various known mixing techniques can be employed so long as even mixing is possible therewith. Examples thereof include a rotary mixer having stirring blades and a kneading extruder with screws.

In a preferred embodiment, the temperature (mixing temperature) at which the carbonizable resin and the eliminable resin are mixed together is not lower than a temperature at which both the carbonizable resin and the eliminable resin soften. As the temperature at which the resins soften, either the melting point of the carbonizable resin or eliminable resin in the case where the resin is a crystalline polymer or the glass transition temperature thereof in the case where the resin is an amorphous resin may be suitably selected. By setting the mixing temperature at a temperature not lower than the temperature at which both the carbonizable resin and the eliminable resin soften, the viscosity of the two resins can be lowered and, hence, more efficient stirring and mixing are possible. There is no particular upper limit on the mixing temperature, but the temperature is preferably 400° C. or lower from the standpoint of preventing resin deterioration due to thermal degradation, thereby obtaining a precursor for the porous carbon material, which has excellent quality.

Also, in the step 1, 90 to 10% by weight of the eliminable resin is mixed with 10 to 90% by weight of the carbonizable resin. The case where the proportions of the carbonizable resin and the eliminable resin are within the range described above is preferred, because the optimal void size or porosity can be arbitrarily designed. The case where the proportion of the carbonizable resin is 10% by weight or more is preferred, because not only it becomes possible to retain the mechanical strength of the material after carbonization, but also the yield is improved. Also, the case where the proportion of the carbonizable material is 90% by weight or less is preferred, because the eliminable resin can efficiently form the voids.

The mixing ratio of the carbonizable resin and the eliminable resin can be arbitrarily selected within the range described above, taking into consideration the compatibility of each material. Specifically, since the compatibility between resins is generally deteriorated as the composition ratio thereof approaches 1:1, when a system which is not so high in the compatibility is selected as a raw material, it is also a preferred embodiment that the compatibility is improved by making the mixture close to a so-called partial composition by increasing or decreasing the amount of the carbonizable resin.

Also, it is also a preferred embodiment that a solvent is added when the carbonizable resin and the eliminable resin are mixed. The addition of the solvent not only lowers the viscosity of the carbonizable resin and the eliminable resin to facilitate molding but also makes the carbonizable resin and the eliminable resin easy to be brought into the compatibly mixed state. The solvent as referred to herein is also not particularly limited, and it may be any so long as it can dissolve or swell at least one of the carbonizable resin and the eliminable resin and is liquid at ordinary temperature. The case where the solvent dissolves both the carbonizable resin and the eliminable resin is a more preferred embodiment, because it becomes possible to improve the compatibility between both.

The amount of the solvent to be added is preferably 20% by weight or more based on the total amount of the carbonizable resin and the eliminable resin, from the stand point of improving the compatibility between the carbonizable resin and the eliminable resin and lowering the viscosity thereof to improve the fluidity. On the other hand, from the standpoint of cost associated with recovery and reuse of the solvent, it is preferably 90% by weight or less based on the total amount of the carbonizable resin and the eliminable resin.

[Step 2]

The step 2 is a step of causing the resin mixture which has been brought into the compatibly mixed state in the step 1 to undergo phase separation by a method not accompanied with a chemical reaction to form a fine structure, followed by fixing it.

The phase separation of the carbonizable resin and the eliminable resin mixed can be induced by various physical and chemical techniques, and examples thereof include a heat-induced phase separation method which induces phase separation by changes in temperature, a non-solvent-induced phase separation method which induces phase separation by addition of a non-solvent, a flow-induced phase separation method which induces phase separation by a physical field, an orientation-induced phase separation method, an electric field-induced phase separation method, a magnetic field-induced phase separation method, a pressure-induced phase separation method, and a reaction-induced phase separation method which induces phase separation by using a chemical reaction. However, in an aspect of the present invention, the reaction-induced phase separation method is excluded for a reason described later. Among these, the heat-induced phase separation method or the non-solvent-induced phase separation method is preferred in terms of being capable of easily producing the porous carbon material of the present invention.

These phase separation methods may be used individually or in combination thereof. Specific methods when used in combination include, for example, a method of inducing non-solvent-induced phase separation by passing through a coagulation bath and thereafter inducing heat-induced phase separation by heating, a method of simultaneously inducing non-solvent-induced phase separation and heat-induced phase separation by controlling the temperature of a coagulation bath, and a method of inducing heat-induced phase separation by cooling a material ejected from a spinneret and thereafter bringing it into contact with a non-solvent.

The term "not accompanied with a chemical reaction" at the time of the phase separation means that the mixed carbonizable resin or eliminable resin does not change its primary structure before and after mixing. The primary structure indicates a chemical structure constituting the carbonizable resin or the eliminable resin. Changes in characteristics such as a significant increase of the elastic modulus are suppressed by not being accompanied with the chemical reaction such as polymerization at the time of the phase separation, and any structure such as a fiber or a film can be formed. As the production process of an embodiment of the present invention, the phase separation accompanied with the chemical reaction is excluded, from the standpoint that the porous carbon material can be stably produced at lower cost. However, the porous carbon material of the present invention shall not be restricted by the production process of the present invention, as described above.

[Removal of Eliminable Resin]

The resin mixture in which the fine structure after the phase separation has been fixed in the step 2 is preferably subjected to removing treatment of the eliminable resin, before being subjected to the carbonization step (step 3), simultaneously with the carbonization step, or in both of them. A method for the removing treatment is not particularly limited, and may be any so long as it is possible to remove the eliminable resin. Specifically, suitable is a method of chemically decomposing the eliminable resin and lowering the molecular weight thereof using an alkali, an acid or an enzyme to remove it, a method of dissolving and removing the eliminable resin with a solvent which dissolves it, a method of decomposing and removing the eliminable resin using radiations such as electron beams, gamma rays, ultraviolet rays and infrared rays or heat, or the like.

In particular, when the eliminable resin can be removed by thermal decomposition, heat treatment can be previously performed at a temperature at which 80% by weight or more of the eliminable resin is eliminated, and the eliminable resin can also be removed by thermal decomposition and gasification in the carbonization step (step 3) or infusibilizing treatment described later. From the standpoint of decreasing the number of steps to enhance the productivity, it is a more preferred embodiment to select the method of removing the eliminable resin by the thermal decomposition and gasification simultaneously with heat treatment in the carbonization step (step 3) or the infusibilizing treatment described later.

[Infusibilizing Treatment]

A precursor material which is the resin mixture in which the fine structure after the phase separation has been fixed in the step 2 is preferably subjected to the infusibilizing treatment before being subjected to the carbonization step (step 3). The method of the infusibilizing treatment is not particularly limited, and a known method can be used. Specific methods include a method of heating the precursor material in the presence of oxygen to cause oxidative crosslinking, a method of irradiating the precursor material with high-energy rays such as electron beams and gamma rays to form a crosslinked structure, and a method of immersing or mixing a substance having a reactive group to form a crosslinked structure. Among them, the method of heating the precursor material in the presence of oxygen to cause the oxidative crosslinking is preferred because the process is simple and it is possible to reduce the production cost. These techniques may be used individually or in combination thereof, and may be used simultaneously or separately.

The heating temperature in the method of heating the precursor material in the presence of oxygen to cause the oxidative crosslinking is preferably 150° C. or higher from the standpoint of allowing the crosslinking reaction to proceed efficiently, and preferably 350° C. or lower from the standpoint of preventing the deterioration of yield caused by a weight loss due to the thermal degradation, combustion or the like of the carbonizable resin.

Also, the oxygen concentration during the treatment is not particularly limited. However, it is preferred to supply a gas having an oxygen concentration of 18% or more, particularly air as it is because it is possible to reduce the production cost. A method for supplying the gas is not particularly limited, and examples thereof include a method of supplying air as it is into a heating device, and a method of supplying pure oxygen into a heating device using a bomb or the like.

Examples of the methods of irradiating the precursor material with high-energy rays such as electron beams and gamma rays to form a crosslinked structure include a method of irradiating the carbonizable resin with electron beams, gamma rays or the like using a commercially available electron beam generator or gamma ray generator or the like to induce crosslinking. The lower limit of the irradiation intensity is preferably 1 kGy or more from the standpoint of efficient introduction of the crosslinked structure by the irradiation, and the irradiation intensity is preferably 1,000 kGy or less from the standpoint of preventing the material strength from being decreased by a lowering of the molecular weight due to scission of a main chain.

The methods of immersing or mixing a substance having a reactive group to form a crosslinked structure include a method of immersing a low molecular weight compound having a reactive group into the resin mixture, followed by heating or irradiation with high-energy rays to allow a crosslinking reaction to proceed, and a method of previously mixing a low molecular weight compound having a reactive group, followed by heating or irradiation with high-energy rays to allow a crosslinking reaction to proceed.

Also, it is also suitable to simultaneously perform the removal of the eliminable resin and the infusibilizing treatment because the benefit of cost reduction due to a decrease in the number of steps can be expected.

[Step 3]

The step 3 is a step of pyrolyzing the resin mixture in which the fine structure after the phase separation has been fixed in the step 2 or the carbonizable resin in the case where the eliminable resin has been already removed, thereby performing carbonization to obtain the carbonized material.

The pyrolysis is preferably preformed by heating at 600° C. or higher in an inert gas atmosphere. The inert gas as referred to herein means a gas which is chemically inert during the heating, and specific examples thereof include helium, neon, nitrogen, argon, krypton, xenon, and carbon dioxide. Among them, it is preferred to use nitrogen or argon from the economic stand point. When the carbonization temperature is 1,500° C. or higher, it is preferred to use argon from the standpoint of suppressing nitride formation.

Also, the flow rate of the inert gas may be any so long as it is an amount which can sufficiently decrease the oxygen concentration in a heating device, and it is preferred to appropriately select an optimal value according to the size of the heating device, the amount of the raw material, the heating temperature and the like. Although the upper limit of the flow rate is also not particularly limited, it is preferred to appropriately set the upper limit according to the temperature distribution or the design of the heating device from the standpoint of profitability and reducing temperature changes in the heating device. Also, when a gas generated during the carbonization can be discharged to the outside of the system, the porous carbon material having excellent quality can be obtained. This is therefore a more preferred embodiment. For this reason, it is preferred to determine the flow rate of the inert gas so that the generated gas concentration in the inside of the system becomes 3,000 ppm or less.

The upper limit of the heating temperature is not limited, and it is preferably 3,000° C. or lower from the standpoint of profitability because special processing is not required for the facilities. Also, in order to increase the BET specific surface area, it is preferably 1,500° C. or lower, and more preferably 1,000° C. or lower.

As for a heating method in the case of continuously performing the carbonization treatment, a method of continuously supplying the material into the heating device maintained at a constant temperature using rollers, a conveyor or the like and taking out it therefrom is preferred, because it is possible to enhance the productivity.

On the other hand, the lower limits of the temperature rising rate and the temperature dropping rate in the case where a batch process is performed in the heating device are not particularly limited. However, a rate of 1° C./min or more is preferred because the productivity can be enhanced by shortening the time required for temperature rise and temperature drop. Also, although the upper limits of the temperature rising rate and the temperature dropping rate are not particularly limited, it is preferred to employ a rate which is lower than the thermal shock resistance of the member that constitutes the heating device.

[Step 4]

The step 4 is a step of activating the carbonized material obtained in the step 3 to obtain the porous carbon material. Methods for activation include but are not particularly limited to a gas activation method, and a chemical activation method. The gas activation method is a method of forming voids by heating at 400 to 1,500° C., preferably at 500 to 900° C., for several minutes to several hours, using oxygen, steam, carbon dioxide gas, air or the like as an activator. Also, the chemical activation method is a method of performing heating treatment for several minutes to several hours using one kind or two or more kinds of zinc chloride, iron chloride, calcium chloride, calcium phosphate, calcium hydroxide, potassium hydroxide, magnesium carbonate, sodium carbonate, potassium carbonate, sulfuric acid, sodium sulfate, potassium sulfate and the like as the activator. If desired, after washing with water, hydrochloric acid or the like, the pH is adjusted, followed by drying.

Generally, the BET specific surface area is increased, and the pore diameter tends to be enlarged, by allowing the activation to more proceed or increasing the amount of the activator to be mixed. Also, the amount of the activator to be mixed is preferably 0.5 parts by weight or more, more preferably 1.0 part by weight or more, and still more preferably 4 parts by weight or more, based on an objective carbon raw material. Although the upper limit thereof is not particularly limited, it is generally 10 parts by weight or less. Also, the chemical activation method tends to enlarge the pore diameter rather than the gas activation method.

In the present invention, the chemical activation method is preferably employed, because the pore diameter can be enlarged, or the BET specific surface area can be increased. Among them, the method of performing the activation with the alkaline chemical such as calcium hydroxide, potassium hydroxide and potassium carbonate is preferably employed.

When the activation is performed with the alkaline chemical, the acid functional group amount tends to be increased. This is sometimes unfavorable depending on the application. In this case, it can also be decreased by performing the heating treatment under a nitrogen atmosphere.

[Pulverization Treatment]

The porous carbon material obtained by performing the activation in the step 4 after pulverization treatment of the carbonized material carbonized through the step 3 or the porous carbon material obtained by pulverizing to a granular form a porous carbon material in which the pores are formed through the activation in the step 4 is also one embodiment of the porous carbon material of the present invention. As for the pulverization treatment, a conventionally known method can be selected, and it is preferred to be appropriately selected depending on the granularity and the treating amount after subjected to the pulverization treatment. As an example of the pulverization treatment method, a ball mill, a bead mill, a jet mill or the like can be exemplified. Although the pulverization treatment may be either continuous or batchwise, it is preferred to be continuous from the standpoint of production efficiency. A filler to be filled in the ball mill is appropriately selected. However, it is preferred to use the filler including a metal oxide such as alumina, zirconia and titania or the filler obtained by coating cores such as stainless steel and iron with nylon, a polyolefin, a polyolefin fluoride or the like, for applications in which contamination with a metal material is unfavorable. For the other applications, a metal such as stainless steel, nickel and iron is preferably used.

Also, at the time of pulverization, it is also a preferred embodiment to use a pulverization aid, in terms of enhancing the pulverization efficiency. The pulverization aid is arbitrarily selected from water, alcohols or glycols, ketones and the like. As the alcohols, ethanol and methanol are preferred from the standpoint of easy availability and cost. In the case of the glycols, ethylene glycol, diethylene glycol, propylene glycol and the like are preferred. In the case of the ketones, acetone, ethyl methyl ketone, diethyl ketone and the like are preferred.

The carbonized material which has undergone the pulverization treatment is made uniform in the granularity by classification, and can form a uniform structure as a filling material or an additive to paste. Therefore, it becomes possible to stabilize the filling efficiency or a coating process of the paste, and it is expected to enhance the production efficiency to reduce cost. As for the particle diameter, it is preferred to be appropriately selected depending on the application of the carbonized material after the pulverization treatment.

EXAMPLES

Preferred examples for carrying out the present invention are described below, but the following examples should not be construed as limiting the present invention.

<Evaluation Methods>

[Structural Period of Co-Continuous Structure Portion]

A porous carbon material was sandwiched between specimen plates, and the positions of a CuKα line source, the specimen and a two-dimensional detector were adjusted so that information on scattering angles less than 10 degrees was obtained from an X-ray source obtained from the CuKα line source. A central portion influenced by a beam stopper was excluded from image data (luminance information) obtained from the two-dimensional detector, a radius vector was provided from a beam center, and luminance values of 360° per an angle of 1° were summed to obtain a scattering intensity distribution curve. From a scattering angle θ at a position where the scattering intensity has a peak in the curve obtained, the structural period of the co-continuous structure portion was obtained by the following formula:

$$L = \frac{\lambda}{2\sin\theta} \qquad [\text{Math. 2}]$$

Structural period: L,
λ: wavelength of incident X-ray

[Average Porosity]

A porous carbon material was embedded in a resin, and thereafter, a cross-section of the porous carbon material was exposed with a razor blade or the like. An argon ion beam was irradiated on a surface of the specimen at an accelerating voltage of 5.5 kV using SM-09010 manufactured by JEOL Ltd. to perform etching. A region of interest necessary for calculation was set to 512 pixels square from an image obtained by observing a central part of the resulting cross-section of the porous carbon material under a scanning secondary electron microscope at a magnification adjusted so as to give 1±0.1 (nm/pixel) and a resolution of 700,000 pixels or more. The average porosity was calculated by the following formula, taking the area of the region of interest as A and the area of a pore portion or an eliminable resin portion as B.

Average porosity (%)=$B/A$×100

[BET Specific Surface Area and Pore Diameter]

After degassing under reduced pressure at 300° C. for about 5 hours, nitrogen adsorption and desorption at a temperature of 77 K using liquid nitrogen were measured by the multipoint method, using "BELSORP-18PLUS-HT" manufactured by BEL Japan, Inc. The surface area was measured by the BET method, and the pore distribution analysis (pore diameter, pore volume) was performed by the MP method or the BJH method.

Example 1

A separable flask was charged with 70 g of polyacrylonitrile (Mw: 150,000, carbon yield: 58%) manufactured by Polysciences, Inc., 70 g of polyvinylpyrrolidone (Mw: 40,000) manufactured by Sigma-Aldrich Co., and 400 g of dimethyl sulfoxide (DMSO) manufactured by Wakenyaku Co., Ltd., as a solvent, and a uniform and transparent solution was prepared at 150° C. with stirring and refluxing for 3 hours. In this solution, the concentrations of polyacrylonitrile and polyvinylpyrrolidone were each 13% by weight.

The DMSO solution obtained was cooled to 25° C., and then ejected at 3 ml/min from a spinneret with one orifice having a diameter of 0.6 mm, followed by introducing into a pure water coagulation bath maintained at 25° C., thereafter taking out at 5 m/min and accumulating on a vat to obtain a raw fiber. In this operation, the air gap was 5 mm, and the immersion length in the coagulation bath was 15 cm. The raw fiber obtained was translucent, and had undergone phase separation.

The raw fiber obtained was dried for 1 hour in a circulating dryer maintained at 25° C. to remove the water present on a surface thereof, and then subjected to vacuum drying at 25° C. for 5 hours to obtain a raw fiber as a dried precursor material.

Thereafter, the raw material as the precursor material was introduced into an electric furnace maintained at 250° C., and heated in an oxygen atmosphere for 1 hour to perform infusibilizing treatment. The raw fiber which had undergone the infusibilizing treatment was changed to black in color.

The infusibilized raw fiber obtained was subjected to carbonization treatment under conditions of a nitrogen flow rate of 1 litter/min, a temperature rising rate of 10° C./min, a reaching temperature of 850° C. and a retention time of 1 min to obtain a carbon fiber having a co-continuous structure. When a cross-section thereof was analyzed, the fiber diameter was 150 μm, and the thickness of a skin layer as a portion having no co-continuous structure was 5 μm. Also, the uniform co-continuous structure was formed in a central part of the fiber.

Then, after the fiber was pulverized using a ball mill, potassium hydroxide was mixed therewith in an amount of 4 times the amount of the carbonized material. The mixture was charged into a rotary kiln, followed by a temperature rise to 800° C. under a flow of nitrogen. After the activation treatment for 1.5 hours, the temperature was dropped, and thereafter washing was performed using water and diluted hydrochloric acid until the pH of the washing liquid reached about 7. The carbon particle obtained had an average porosity of a co-continuous structure portion of 40%, and a structural period of 76 nm. Also, it had the structure that the portion having no co-continuous structure was contained in a part of the particle. The BET specific surface area was 2,610 m$^2$/g, the average diameter of the pores according to the MP method was 0.7 nm, and the pore volume was 2.1 cm$^3$/g. The results thereof are shown in Table 1.

Example 2

A process was performed in the same manner as in Example 1 except that sodium hydroxide was used in place of potassium hydroxide in the activation treatment. The porous carbon particle obtained had an average porosity of a co-continuous structure portion of 40%, and a structural period of 76 nm, similarly to Example 1. Also, it had a structure that a portion having no co-continuous structure was contained in a part of the particle. On the other hand, although the BET specific surface area was 2,554 m$^2$/g, which was approximately equivalent to that in Example 1, the average diameter of pores according to the MP method was 1.5 nm, which was twice as large as that in Example 1, and the pore volume was 1.9 cm$^3$/g. The results thereof are shown in Table 1.

Example 3

In Example 1, steam activation was performed in place of alkali activation. That is, a carbon fiber obtained in the same manner as in Example 1 was pulverized in a ball mill, and thereafter charged into a rotary kiln, followed by a temperature rise to 850° C. under a flow of nitrogen. After the temperature reached 850° C., steam was supplied into the rotary kiln together with nitrogen, and the steam activation was performed for 2 hours. After the activation treatment, washing was performed in the same manner as in Example 1. The porous carbon powder obtained had an average porosity of a co-continuous structure portion of 40%, and a structural period of 76 nm, similarly to Example 1. Also, it had a structure that a portion having no co-continuous structure was contained in a part of the particle. On the other hand, the BET specific surface area was as low as 405 m$^2$/g, the average diameter of pores according to the MP method was 0.4 nm, which was about a half of that in Example 1, and the pore volume was also as small as 0.2 cm$^3$/g. The results thereof are shown in Table 1.

Example 4

A carbon fiber was obtained in the same manner as in Example 1 except that the concentrations of polyacrylonitrile and polyvinylpyrrolidone were each changed to 7.5% by weight. The average porosity of a central part of the porous carbon fiber obtained, namely the porous carbon material, was 45%, and the structural period of a co-continuous structure portion was 230 nm, which was larger than that in Example 1. The thickness of a skin layer as a portion having no co-continuous structure was 5 similarly to Example 1. Also, a uniform co-continuous structure was formed in a central part of the fiber.

Then, after the fiber was pulverized using a ball mill, activation treatment was performed. Namely, potassium hydroxide was mixed therewith in an amount of 4 times the amount of the carbonized material. The mixture was charged into a rotary kiln, followed by a temperature rise to 850° C. under a flow of nitrogen. After the activation treatment for 1.5 hours, the temperature was dropped, and thereafter washing was performed using water and diluted hydrochloric acid until the pH of the washing liquid reached about 7. The porous carbon powder obtained had an average porosity of a co-continuous structure portion of 40%, and a structural period of 230 nm. Also, it had a structure that a portion having no co-continuous structure was contained in a part of the particle. The BET specific surface area was 2,012 m$^2$/g, the average diameter of pores according to the MP method was 0.8 nm, and the pore volume was 2.0 cm$^3$/g. The results thereof are shown in Table 1.

Example 5

A porous carbon particle was obtained in the same manner as in Example 1 except that water application by spraying was used in place of the coagulation bath. The porous carbon particle obtained had an average porosity of a co-continuous structure portion of 50%, and the structural period of 1,800 nm. Also, it had a structure that a portion having no co-continuous structure was contained in a part of the particle. The BET specific surface area was 1,853 m$^2$/g, the average diameter of pores according to the MP method was 0.8 nm, and the pore volume was 2.0 cm$^3$/g. The results thereof are shown in Table 1.

Example 6

A porous carbon particle was obtained in the same manner as in Example 1 except that the pyrolysis temperature was changed to 1,500° C. The porous carbon particle obtained had an average porosity of a co-continuous structure portion of 40%, and the structural period of 76 nm. Also, it had a structure that a portion having no co-continuous structure was contained in a part of the particle. The BET specific surface area was 378 m$^2$/g, the average diameter of pores according to the MP method was 1.4 nm, and the pore volume was 0.2 cm$^3$/g. The results thereof are shown in Table 1.

Comparative Example 1

There were mixed 60% by weight of an acrylonitrile copolymer (PAN copolymer) composed of 98 mol % of acrylonitrile and 2 mol % of methacrylic acid and having a specific viscosity of 0.24 and 40% by weight of a thermally decomposable copolymer (PMMA copolymer) composed of 99 mol % of methyl methacrylate and 1 mol % of methyl acrylate and having a specific viscosity of 0.21, and the mixture of both copolymers was dissolved in dimethylformamide (DMF) as a solvent to a solution concentration of 24.8% by weight to prepare a DMF mixed solution. The resulting solution was visually uniform, but when observed by an optical microscope, liquid droplets were observed, and phase separation already proceeded in a stage of the solution.

Using this DMF mixed solution, spinning, infusibilization and carbonization treatment were performed in the same manner as in Example 1 to obtain a carbon fiber. The carbon fiber obtained was not uniform in the pore shape and size in a cross-section, and had an unclear skin layer. In particular, since a large number of pores were formed in the skin layer portion, it had a shape difficult to use for composite with another material or as a separation membrane material. Also, calculation of the structural period was attempted. However, no peak was present in a spectrum obtained, and it was inferior in uniformity of the structure. The results thereof are shown in Table 1.

Comparative Example 2

Magnesium oxide (average particle diameter: 500 nm) was added to polyvinyl alcohol (average polymerization degree: 2,000) at a ratio of 1:1. Thereafter, the mixture was charged into a rotary kiln, followed by a temperature rise to 900° C. under a flow of argon. After treatment for 1 hour, washing was performed with an aqueous solution of diluted sulfuric acid and water to obtain a porous carbon. The porous carbon obtained was not uniform in the pore shape and size in a cross-section. Although calculation of the structural period was attempted, no peak was present in a spectrum obtained, and it was inferior in uniformity of the structure. The results thereof are shown in Table 1.

Comparative Example 3

A process was performed in the same manner as in Example 1 except that the activation treatment was not performed. The porous carbon particle obtained had an average porosity of a co-continuous structure portion of 40%, and a structural period of 76 nm, similarly to Example 1. Also, it had a structure that a portion having no co-continuous structure was contained in a part of the particle. However, the BET specific surface area was as small as 35 m$^2$/g, and no pores according to the MP method were confirmed. The results thereof are shown in Table 1.

Comparative Example 4

To 100 g of a 50% by weight methanol solution of phenol resol (grade: PL2211) manufactured by Gunei Chemical Industry Co., Ltd. were added 30 g of polymethyl methacrylate (PMMA) manufactured by Wako Pure Chemical Industries, Ltd. and 100 g of acetone, followed by stirring to dissolve PMMA. The solution prepared was poured in a dish made of polytetrafluoroethylene and dried at room temperature for 3 days. Further, it was dried in a vacuum oven at 23° C. for 2 days to remove the solvent, and thereafter the temperature of the oven was set to 40° C., followed by drying for 2 days, in order to completely remove the solvent. The resulting amber-colored solid sample was molded to a flat plate of length×width×height=50 mm×50 mm×5 mm using a 37t press molding machine at a molding pressure of 10 kgf/cm$^2$ and a temperature of 180° C. for 10 minutes. This sample was washed with stirring in acetone for 2 days to completely remove the PMMA component. Thereafter, the sample was heated in a siliconit furnace by raising the temperature to 700° C. at a temperature rising rate of 2° C./min under a nitrogen flow at 1 litter/min and maintained at this temperature for 1 hour to perform pyrolysis, thereby preparing a sample (porous material). In the sample obtained, pores having a diameter of 20 to 30 nm were observed, but no pores having a diameter of 2 nm or less according to the MP method were detected. Also, the surface area of the sample obtained was as small as 71 m$^2$/g. The results thereof are shown in Table 1.

TABLE 1

| | Co-continuous Structure | | | BET | | Pore | | | |
|---|---|---|---|---|---|---|---|---|---|
| | | | | | | Average | | Average | |
| | Observed/ Not Observed | Structure Period (nm) | Average Porosity (%) | Specific Surface Area ($m^2/g$) | Observed/ Not Observed | Diameter (MP Method) (nm) | Volume (MP Method) ($cm^3/g$) | Diameter (BJH Method) (nm) | Volume (BJH Method) ($cm^3/g$) |
| Example 1 | Observed | 76 | 40 | 2610 | Observed | 0.7 | 2.1 | 3 | 2.3 |
| Example 2 | Observed | 76 | 40 | 2554 | Observed | 1.5 | 1.9 | 4.1 | 2.5 |
| Example 3 | Observed | 76 | 40 | 405 | Observed | 0.4 | 0.2 | — | — |
| Example 4 | Observed | 230 | 40 | 2012 | Observed | 0.8 | 2.0 | 3 | 2.1 |
| Example 5 | Observed | 1800 | 50 | 1853 | Observed | 0.8 | 2.0 | 3 | 2.1 |
| Example 6 | Observed | 76 | 40 | 378 | Observed | 1.4 | 0.2 | 7.2 | 0.3 |
| Comparative Example 1 | Not Observed | — | — | 1755 | Observed | 0.9 | 0.8 | 1.5 | 0.32 |
| Comparative Example 2 | Not Observed | — | — | 1200 | Observed | 1.1 | 1.9 | — | — |
| Comparative Example 3 | Observed | 76 | 40 | 35 | Not Observed | ND | ND | 15 | 0.135 |
| Comparative Example 4 | Observed | 102 | 45 | 71 | Observed | ND | ND | 22 | 0.21 |

The invention claimed is:

1. A porous carbon material having a co-continuous structure portion in which carbon skeletons and voids form continuous structures, respectively and which has a structural period of 0.002 μm to 3 μm, having pores which have an average diameter of 0.01 to 10 nm on a surface of the carbon skeletons in the co-continuous structure portion, and having a BET specific surface area of 100 $m^2/g$ or more.

2. The porous carbon material according to claim 1, wherein a pore volume measured by an MP method is 0.1 $cm^3/g$ or more.

3. The porous carbon material according to claim 2, wherein the pore volume measured by an MP method is 1.5 $cm^3/g$ or more.

4. The porous carbon material according to claim 1, wherein the BET specific surface area is 1,000 $m^2/g$ or more.

5. The porous carbon material according to claim 1, having a portion having substantially no co-continuous structure.

6. An electrode material using the porous carbon material according to claim 1.

7. An adsorption material using the porous carbon material according to claim 1.

8. A process for producing the porous carbon material according to claim 1, the process comprising:

step 1: a step of bringing 10 to 90% by weight of a carbonizable resin and 90 to 10% by weight of an eliminable resin into a compatibly mixed state to obtain a resin mixture;

step 2: a step of causing the resin mixture to undergo phase separation by a method not accompanied with a chemical reaction, and fixing the separated phases;

step 3: a step of performing carbonization by pyrolysis; and step 4: a step of activation, in this order.

9. The process for producing a porous carbon material according to claim 8, wherein an infusibilizing treatment is further performed after the step 2.

10. The process for producing a porous carbon material according to claim 8, wherein, in the step 4, the activation is performed with an alkaline chemical.

11. The process for producing a porous carbon material according to claim 8, wherein a pulverization treatment is further performed after the step 3 and before or after the step 4.

12. The porous carbon material according to claim 1, wherein the average diameter of the pores is 0.01 to 2 nm.

* * * * *